United States Patent
Fukuzumi

[11] Patent Number: 6,144,757
[45] Date of Patent: Nov. 7, 2000

[54] SYSTEM AND METHOD FOR IDENTIFYING AN ORGANISM

[75] Inventor: Shinichi Fukuzumi, Tokyo, Japan

[73] Assignee: NEC Corporation, Tokyo, Japan

[21] Appl. No.: 09/031,455

[22] Filed: Feb. 26, 1998

[30] Foreign Application Priority Data

Feb. 28, 1997 [JP] Japan .................................. 9-062247

[51] Int. Cl.⁷ .................................................. G06K 9/00
[52] U.S. Cl. ...................... 382/124; 382/116; 340/825.34
[58] Field of Search .................. 382/124, 125, 382/126, 127, 115, 116; 356/71; 340/825.34, 825.31, 825.3, 573; 427/1; 396/15; 395/200.55; 600/384, 547, 546; 250/227

[56] References Cited

U.S. PATENT DOCUMENTS

| | | | |
|---|---|---|---|
| 4,537,484 | 8/1985 | Fowler et al. | 396/15 |
| 4,569,080 | 2/1986 | Schiller | 382/126 |
| 4,924,085 | 5/1990 | Kato et al. | 250/227 |
| 5,412,463 | 5/1995 | Sibbald et al. | 356/71 |
| 5,436,613 | 7/1995 | Ghosh et al. | 340/573 |
| 5,601,867 | 2/1997 | Riedl et al. | 427/1 |
| 5,757,278 | 5/1998 | Itsumi | 340/825.31 |
| 5,864,296 | 1/1999 | Upton | 340/825.3 |
| 5,887,140 | 3/1999 | Itsumi et al. | 395/200.55 |

FOREIGN PATENT DOCUMENTS

| | | |
|---|---|---|
| 61-182174 | 8/1986 | Japan . |
| 62-74173 | 4/1987 | Japan . |
| 1-233556 | 9/1989 | Japan . |
| 2-1243 | 1/1990 | Japan . |
| 2-133892 | 5/1990 | Japan . |
| 3-53385 | 3/1991 | Japan . |
| 3-87980 | 4/1991 | Japan . |
| 3-87981 | 4/1991 | Japan . |
| 3-46874 | 7/1991 | Japan . |
| 3-46875 | 7/1991 | Japan . |
| 3-266186 | 11/1991 | Japan . |
| 4-241680 | 8/1992 | Japan . |
| 6-187430 | 7/1994 | Japan . |

*Primary Examiner*—Amelia Au
*Assistant Examiner*—Vikkram Bali
*Attorney, Agent, or Firm*—Ostrolenk, Faber, Gerb & Soffen, LLP

[57] ABSTRACT

An organism identification system that can identify whether or not a fingerprint image input object is a living body at a fingerprint collating time. A finger collator slides his finger at the time of inputting a fingerprint image. Meanwhile the finger is contact with bioelectric potential lead-out portions and a bioelectric potential grounding portion. Sliding of the finger causes a variation in the muscle potential of the finger. The bioelectric potential lead-out portions and the bioelectric potential grounding portion output electric signals corresponding to the potential variation to a bioelectric signal amplification section. The bioelectric signal amplification section amplifies the difference between electric signals from the bioelectric potential lead-out portions while the bioelectric potential grounding portion is at the ground potential. A signal peculiar to a living body is generated by sliding the finger. When an illegal person slides a replica, a variationless signal occurs. The bioelectric signal identification section identifies a living body based on differences in the signals.

22 Claims, 24 Drawing Sheets

SYSTEM AND METHOD FOR IDENTIFYING AN ORGANISM

BACKGROUND OF THE INVENTION

The present invention relates to an organism identification system, and more particularly to an organism identification system that can identify whether or not a fingerprint image input object is a living body's finger, by utilizing organic information in a fingerprint image input operation. The present invention also relates to an organism identification method.

Conventionally, personal collation has been performed by extracting the feature amount of an input fingerprint image and then comparing it with the feature amount of a fingerprint previously stored. Fingerprints, being information peculiar to a personal, can be processed using digital data with improved resolution to execute personal collation with very high precision.

However, the personal collation by fingerprints may bring the risk that the security is broken by a replica with the same rough surface as that of a genuine fingerprint. In order to avoid such a risk, the conventional way has been carried out by identifying whether or not a fingerprint image input object corresponds to a human's (living body's) finger and then judging that the object is a counterfeit, in spite of the collation result of a fingerprint, if it is identified that the object is not a living body's finger. In order to ensure the security, it is important to identify whether or not a fingerprint image input object corresponds to a living body's finger. Various techniques have conventionally proposed to maintain the security.

JP-A-241680/1992, for example, discloses a security technique. According to this technique, a fingerprint image input object placed on a fingerprint sensor is heated or vibrated at the time of inputting fingerprint data. Then, if there is a response such as "strongly press the fingerprint sensor", "speak", or "press down the key" within a predetermined time, it is judged that the object corresponds to a living body's finger. If there is no response within a predetermined time, it is judged that the object is a replica.

Moreover, JP-A-187430/1994, for example, discloses the technique of identifying whether or not an object is a living body's finger by measuring pulses and blood pressures by a pressure sensor. The pressure sensor is disposed in an image input section on which a finger is rested at a fingerprint collation time. This prior art also discloses the technique of identifying whether or not an object is a living body's finger by detecting infrared rays radiated from a finger by means of an infrared-rays sensor.

However, the above-mentioned prior arts have the following disadvantages.

According to the technique disclosed in JP-A-241680/1992, an illegal person trying to use a replica may act to a response such as "strongly press the fingerprint sensor" or "speak". Moreover, because an illegal person can sense stimulation such as vibrations given to a replica, the replica can be easily recognized erroneously as a living body's finger. That is, when an illegal person senses stimulation such as vibrations given to a replica, the replica can be recognized easily and erroneously as a living body by strongly depressing the fingerprint sensor or uttering a voice.

Moreover, according to the art disclosed in JP-A-187430/1994, the pressure sensor produces a simple signal. Hence, when a pressure is applied to the pressure sensor by using a replica placed on the image input section, the pressure sensor can produce signals (corresponding to pulses or blood pressures) by which the replica is erroneously recognized as a living body's finger. Moreover, in infrared rays sensing technique, a replica can be erroneously recognized as a living body's finger by merely fitting an infrared-ray radiating device with the replica.

JP-A-233556/1989 discloses the art for first identifying a person with a static pattern such as fingerprint, voice pattern, or password number, and then, if passed, providing inquires from a third party to the person, and identifying the person based on responses, electrocardiograms, or brain waves. However, this publication does not disclose the art of automatically identifying whether or not a fingerprint image input object is a living body is identified, at the time of inputting a fingerprint.

OBJECTS AND SUMMARY OF THE INVENTION

The present invention is made to solve the above-mentioned problems. The objective of the present invention is to provide an organism identification system that can securely identify whether or not a fingerprint image input object relates to a living body.

Another objective of the present invention is to provide an organism identification method that can securely identify whether or not a fingerprint image input object relates to a living body.

The objective of the present invention is achieved by an organism identification system, comprising a finger rest on which a fingerprint image input object slides at the time of inputting a fingerprint image while the object is in contact with the upper surface of the finger rest, plural bioelectric potential lead-out portions each for leading out electric signals produced from the fingerprint image input object sliding on the finger rest, and an identification section for identifying whether or not the fingerprint image input object corresponds to a living body based on the electric signals derived from of the plural bioelectric potential lead-out portions.

In the above-mentioned arrangement, a finger collator slides his finger on the finger rest at the time of inputting a fingerprint image. Sliding of the finger causes a variation in the muscle potential of said finger. Plural bioelectric potential lead-out portions produce electric signals each corresponding to the potential variation. The bioelectric signal identification section identifies whether or not a fingerprint image input object is a living body based on the electric signals derived from the bioelectric potential portions. In this case, since each of the bioelectric potential lead-out portions produces an electric signal peculiar to a living body, the identification section can identify that the fingerprint image input object is a living body.

In contrast, when an illegal person slides a replica with the same rough surface as that of a fingerprint on the finger rest to input a fingerprint image, the bioelectric potential lead-out portions produce electric signals different from those from a living body. As a result, the identification section can identify that the fingerprint image input object is not a living body.

An illegal person may use a replica with electrodes for producing imitation bioelectric signals for erroneous identification. In this case, when an illegal person slides on the finger rest to input a fingerprint image, the electrodes may be intermittently contacted with the bioelectric potential lead-out portions. When in contact with the electrodes on the replica, the bioelectric potential lead-out portion leads out the same electric signal as that produced from a living body. When not in contact with the electrodes, the bioelectric potential lead-out portion leads out the electric signal different from that produced from a living body. Since the transition from a contact state to a non-contact, and vice versa causes occurrence of high-level noise, the identification section can identify that the fingerprint image input object is not a living body when a replica is used.

According to the present invention, an organism identification system comprises a finger rest on which a fingerprint image input object slides at the time of inputting a fingerprint image while the object is in contact with the upper surface of the finger rest, plural bioelectric potential lead-out portions each for leading out an electric signal produced from the fingerprint image input object to be slidden on the finger rest, a finger slider for sliding according to movement of the fingerprint image input object, the finger slider being in contact with the fingerprint input object to be slidden on the finger rest, a bioelectric potential grounding portion fixed on the finger rest, the finger slider being in contact with the fingerprint image input object to be slidden on the finger rest, a bioelectric signal amplification section for producing a difference electric signal between electric signals from the bioelectric potential grounding portion while the potential of the plural bioelectric potential grounding portion is at the ground potential, and an identification section for identifying whether or not the fingerprint image input object corresponds to a living body based on the electric signal derived from of the bioelectric signal amplification section. Thus, the bioelectric signal identification section can prevent the mixing of noise into the electric signal which identifies a living body, so that the living body can be identified with higher precision.

In the above-mentioned configuration, the bioelectric potential grounding portion is fixed to the finger slider sliding according to movement of a finger. The bioelectric signal amplification section produces a difference between electric signals from plural bioelectric potential lead-out portion while the potential of the bioelectric potential grounding portion is at the ground potential. The identification section identifies whether or not the fingerprint image input object placed on the finger rest corresponds to a living body based on the difference output from the bioelectric signal amplification section.

Furthermore, according to the present invention, an organism identification method comprising the steps of sliding a fingerprint image input object on a finger rest at the time of inputting a fingerprint image while the object is in contact with the upper surface of the finger rest, leading out electric signals produced from the fingerprint image input object sliding on the finger rest by plural bioelectric potential lead-out portions, and identifying whether or not the fingerprint image input object corresponds to a living body based on the electric signals derived from of the plural bioelectric potential lead-out portions by an identification section.

BRIEF DESCRIPTION OF THE DRAWINGS

These and other objects, features and advantages of the present invention will become more apparent upon a reading of the following detailed description and drawings, in which.

DETAILED DESCRIPTION OF THE PREFERRED EMBODIMENTS

Figure 1:
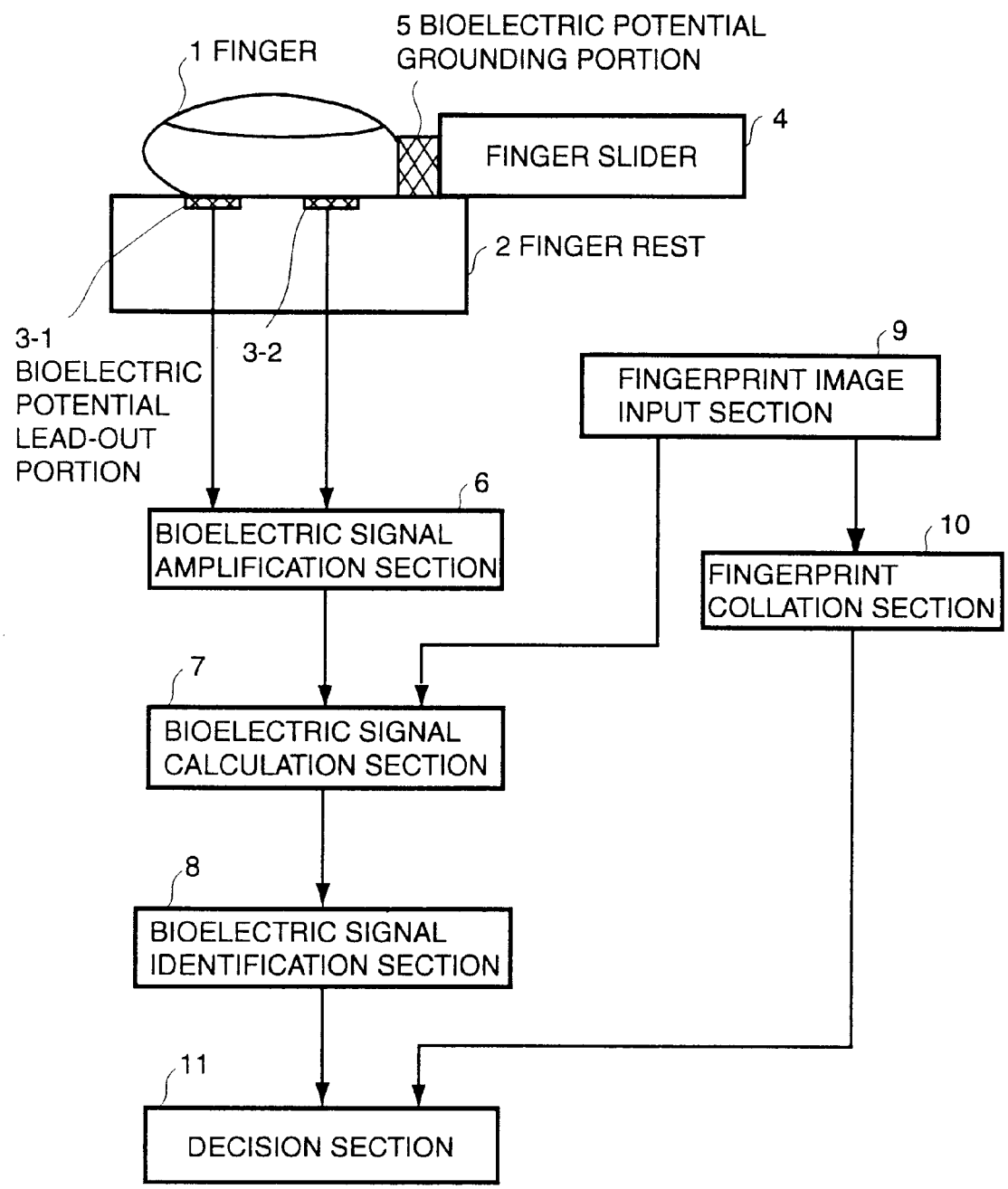
FIG. 1 is a block diagram illustrating an organism identification system according to the present invention.

Next, embodiments of the present invention will be described below in detail with reference to the attached drawings. FIG. 1 is a block diagram showing an organism identification system according to an embodiment of the present invention. The organism identification system comprises a finger rest 2 for sliding a finger 1 at the time of inputting a fingerprint image while the finger 1 is in contact with the top surface of the finger rest 2, plural bioelectric potential lead-out portions 3-1 and 3-2, a finger slider 4, a bioelectric potential grounding portion 5, a bioelectric signal amplification section 6, a bioelectric signal calculation section 7, a bioelectric signal identification section 8, a fingerprint image input section 9, a fingerprint collation section 10, and a decision section 11.

The finger rest 2 is formed of a transparent member. Plural bioelectric potential lead-out portions 3-1 and 3-2 are securely fixed on the top surface of the finger rest 2. The bioelectric potential lead-out portions 3-1 and 3-2 are always in contact with parts of the finger 1 while the finger 1 is being slidden in a predetermined direction. If parts of the finger 1 are always in contact with the bioelectric potential lead-out portions 3-1 and 3-2 while the finger 1 is being slidden on the finger rest 2, part of the bioelectric potential lead-out portions 3-1 and 3-2 may be fixed to the finger slider 4.

The finger slider 4 is slidably attached to the finger rest 2. When the finger 1 slides over the finger rest 2, with the side surface thereof in contact with the finger slider 4, the finger slider 4 slides according to the movement of the finger 1. The bioelectric potential grounding portion 5 is fixed on the side surface of the finger slider 4. The bioelectric signal amplification section 6 amplifies the difference between the electric signal from the bioelectric potential lead-out portion 3-1 and the electric signal from the bioelectric potential lead-out portion 3-2. Meanwhile, the bioelectric potential grounding portion 5 is at the ground potential.

The bioelectric signal calculation section 7 produces various pieces of data to identify whether or not electric signals output from the bioelectric signal amplification section 6 are based on electric signals generated from a living body. The data relates to the amplitude of an electric signal output from the bioelectric signal amplification section 6 during the sliding of the finger 1. The data relates to the frequency, the base line variation, and the polarity of the electrical signal output from the bioelectric signal amplification section 6. The sliding of the finger 1 is judged based on the notification from the fingerprint image input section 9.

The bioelectric signal identification section 8 identifies whether or not a fingerprint image input object placed on the finger rest 2 corresponds to a living body, based on various pieces of data output from the bioelectric signal calculation section 7.

The fingerprint image input section 9 inputs the fingerprint image of a finger 1 when the finger 1 slides on the finger rest 2. The fingerprint image input section 9 notifies the bioelectric signal calculation section 7 of the finger 1 sliding on the finger rest 2.

The fingerprint collation section 10 collates the fingerprint based on the fingerprint image input by the fingerprint image input section 9. The decision section 11 judges the right person based on the bioelectric identification results by the bioelectric signal identification section 8 and the fingerprint collation results by the fingerprint collation section 10.

Next, the operation of the organism identification system will be described below.

In the fingerprint collation, a fingerprint collator places his finger 1 at the starting position of the finger rest 2 to input his fingerprint image. Thereafter, the finger 1 slides on the finger rest 2 in a predetermined direction by a predetermined distance. In this operation, the side surface of the finger 1 is always in contact with the finger slider 4 and the bioelectric potential grounding portion 5. Since the finger slider 4 slides according to the movement of the finger, the bioelectric potential grounding section 5 fixed on the finger slider 4 is always in contact with the finger 1 at the same position.

When the fingerprint collator slides the finger 1 over the finger rest 2, the fingerprint image input section 9 inputs the fingerprint image of the finger 1 and informs the bioelectric signal calculation section 7 of the input operation. The fingerprint collation section 10 collates the fingerprint image input to the fingerprint image input section 9 with the fingerprint of the collator previously stored and then informs the decision section 11 of the collation result.

When the fingerprint collator slides his finger to input the fingerprint image, the muscle potential of the finger varies. The electric signal corresponding to the potential variation is derived from the bioelectric potential grounding portions 3-1 and 3-2 and the bioelectric potential grounding portion 5.

The bioelectric signal amplification section 6 amplifies the difference between the signal from the bioelectric potential lead-out portion 3-1 and the signal from the bioelectric potential lead-out portion 3-2 while the bioelectric potential grounding portion 5 is at the ground potential.

The bioelectric signal calculation section 7 calculates data while the fingerprint image input portion 9 notifies the sliding of the finger 1, and then transmits it to the bioelectric signal identification section 8. The data relates to the frequency, the amplitude, the polarity, the base line variation, and other data relating to the electric signal output from the bioelectric signal amplifier 6.

The bioelectric signal identification section 8 identifies whether or not the fingerprint image input object corresponds to a living body, based on various pieces of data output from the bioelectric signal calculation section 7, and then transmits the identification result to the decision section 11.

Generally, the muscle potential of a living finger ranges from 10 $\mu$V to 10 mV. However, the muscle potential generated during the sliding of a finger indicates a small variation in the above-mentioned voltage range and its frequency ranges from 2 Hz to 2 KHz. The positive or negative polarity of the signal output from the bioelectric signal calculation section 7 depends on subtracting the electric signal from the bioelectric potential lead-out portion 3-2 from the electric signal from the bioelectric potential lead-out portion 3, and vice versa. This means that the bioelectric signal identification section 8 judges that the fingerprint image input object corresponds to a living body if data output from the bioelectric signal calculation section 7 satisfies the above-mentioned conditions.

In contrast, where a replica with the same roughness as that of a fingerprint slides over the finger rest 2, the bioelectric signal amplification section 6 produces a variation-less signal or noise only. In this case, since various pieces of data output from the bioelectric signal calculation section 7 do not satisfy the above-mentioned conditions, the bioelectric signal identification section 8 judges that the fingerprint image input object does not correspond to a living body.

If a replica with electrodes for producing imitation bioelectric signals slides over the finger rest 2 to input a fingerprint image, the electrodes are intermittently contacted to the bioelectric potential lead-out portions 3-1 and 3-2 and the bioelectric potential grounding portion 5. In a non-contact state, the electric signal output from the bioelectric signal amplification section 6 differs from a signal obtained when a living body slides. High level noise is generated when the electrodes are changed from a contact state to a non-contact state or from a non-contact state to a contact state. The polarity of an electric signal output from the bioelectric signal amplification section 6 depends on the polarities of electric signals from the bioelectric potential lead-out portions 3-1 and 3-2. However, since the polarity is information not known by an illegal user, the polarity of the electric signal output from the bioelectric signal amplification section 6 may be reversed. Hence, where the replica is used in place of the finger 1, various pieces of data output from the bioelectric signal calculation section 7 do not satisfy the above-mentioned conditions, so that the bioelectric signal identification section 8 judges that the fingerprint image input object does not correspond to a living body.

When the identification result from the bioelectric signal identification section 8 indicates a living body and the collation result from the fingerprint collation section 10 indicates an authorized person, then the decision section 11 identifies the person correctly.

Referring to FIG. 1, the absence of the bioelectric potential grounding portion 5 may cause noises induced on the electric signal from the bioelectric potential lead-out portions 3-1 and 3-2, but noises do not interfere with the operation of identifying a living body.

Figure 2:
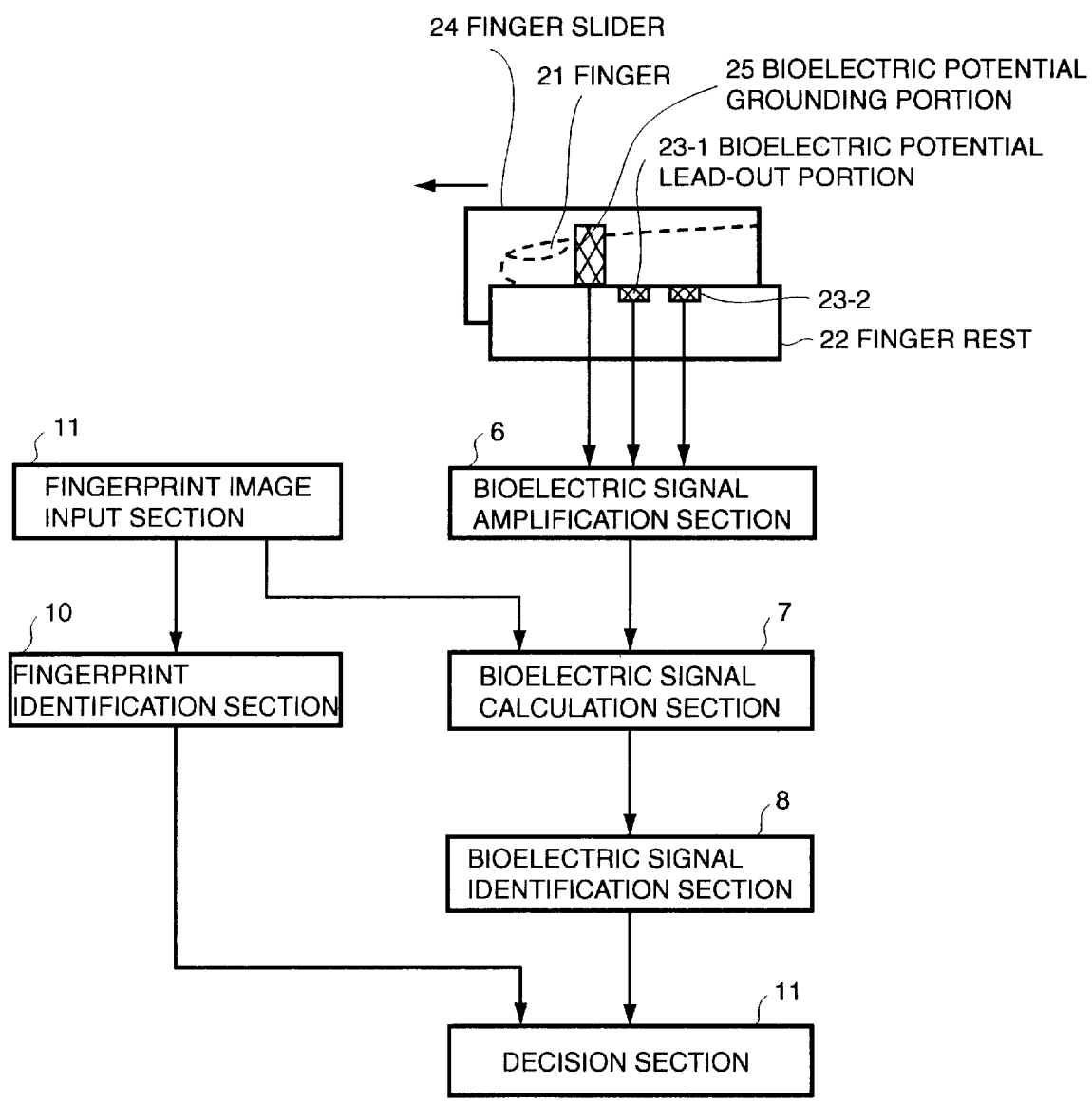
FIG. 2 is a block diagram illustrating an organic identification system according to another embodiment of the present invention.

FIG. 2 is a diagram showing an organism identification system according to another embodiment of the present invention. The organism identification system includes a finger rest 22 for sliding in a predetermined direction, with a finger 21 in contact with the upper surface of the finger rest 22 when, a fingerprint image is input, two bioelectric potential lead-out portions 23-1 and 23-2, a finger slider 24, and a bioelectric potential grounding portion 25. The organism identification system of FIG. 2 further includes a bioelectric signal amplification section 6, a bioelectric signal calculation section 7, a bioelectric signal identification section 8, a fingerprint collation section 10, and a decision section 11 as with the organism identification system of FIG. 1.

Figure 3:
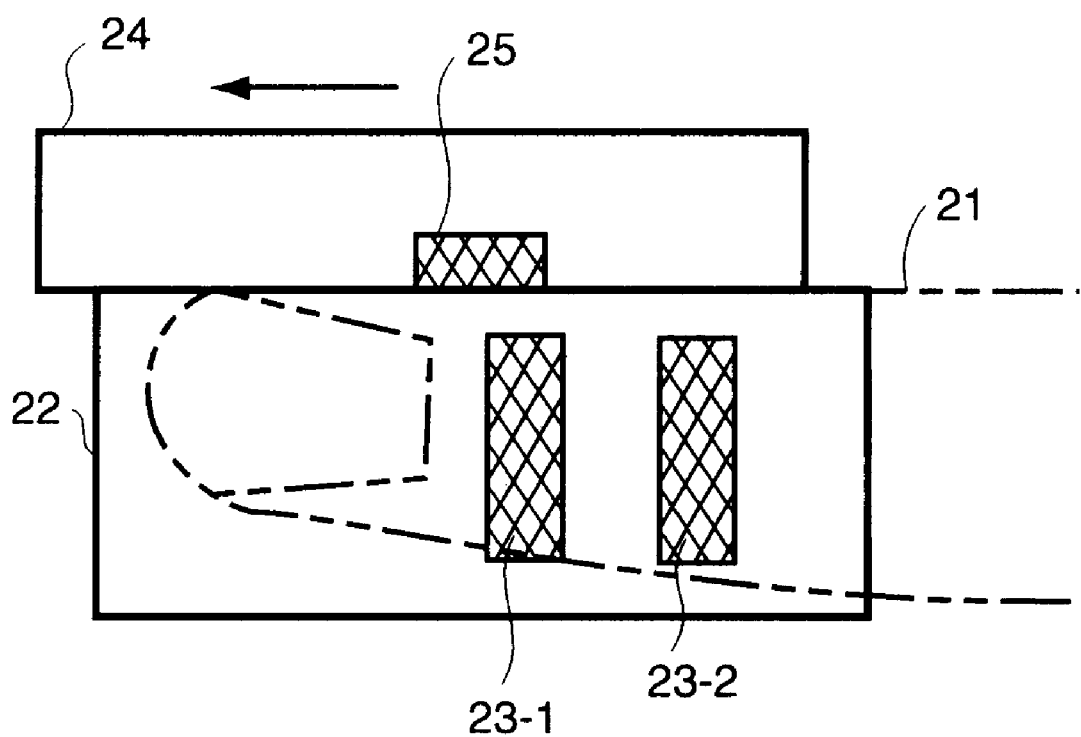
FIG. 3 is a top view illustrating a combination of the finger rest 22 and the finger slider 24 according to an embodiment of the present invention.
Figure 4:
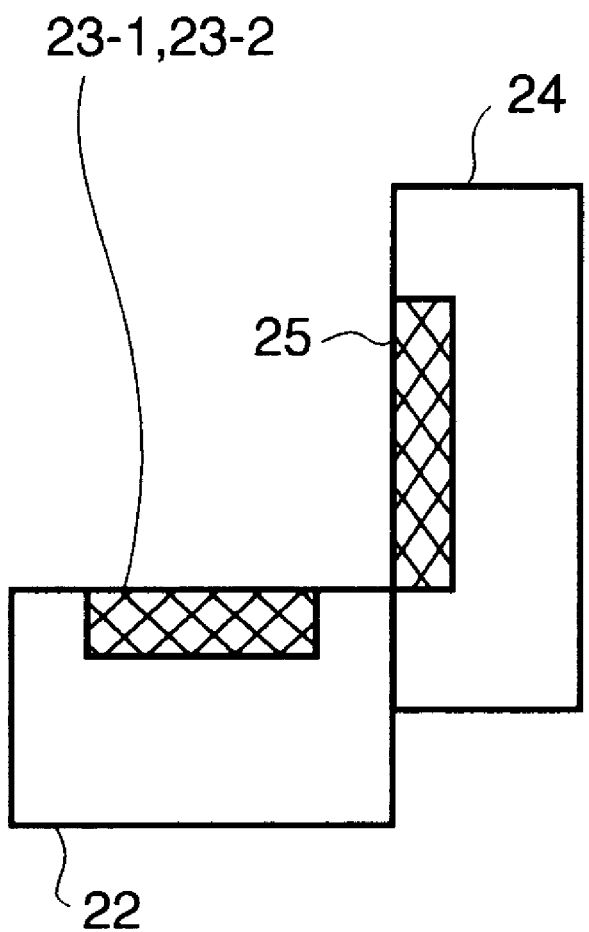
FIG. 4 is a side view illustrating the combination of the finger rest 22 and the finger slider 24 according to the embodiment of FIG. 2.

FIG. 3 is a top view illustrating a combination of the finger rest 22 and the finger slider 24. FIG. 4 is a side view illustrating a combination of the finger rest 22 and the finger slider 24. Like numerals represent the same elements as those in FIG. 2.

The finger rest 22 is made of a transparent member. Two bioelectric potential lead-out portions 23-1 and 23-2 are fixed on the upper surface of the finger rest 22. Each of the bioelectric potential lead-out portions 23-1 and 23-2 is formed of a bioelectric electrode (e.g. a blue sensor manufactured by MEDICOTEST). In order to slide the finger 21 on the finger rest, 22 at the time of inputting a fingerprint image, part of the finger 21 is always fixed to the finger rest 22.

The finger slider 24 is slidably attached to the finger rest 22. As shown in FIGS. 2 and 3, while the finger 21 is sliding on the finger rest 22 in the arrow direction, with the side surface of the finger 21 in contact with the finger sliding portion 24, the finger slider 24 slides in the same direction.

The bioelectric potential grounding portion 25 is fixed on the side surface of the finger sliding portion 24. The bioelectric potential grounding section 25 is formed of a bioelectric electrode (e.g. a blue sensor manufactured by MEDICOTEST).

The bioelectric signal amplification section 6 amplifies the difference between the electric signal from the bioelectric potential lead-out portion 23-1 and the electric signal from the bioelectric potential lead-out portion 23-1. Meanwhile, the bioelectric potential grounding portion 25 is at the ground potential. The bioelectric signal amplification section 6 is formed of, for example, the polygraph 360 manufactured by NEC Medical Systems.

The bioelectric signal calculation section 7 issues necessary data to identify whether or not the bioelectric signal amplification section 6 has produced the electric signal regarding amplitude, frequency, base line variation, polarity, and the like based on bioelectric signals while the fingerprint image input section 9 is receiving a fingerprint image. The bioelectric signal calculation section 7 consists of, for example, the model PC9821Xa manufactured by NEC.

The bioelectric signal identification section 8 judges whether or not the fingerprint image input object placed on the finger rest 22 corresponds to a living body, based on various pieces of data output from the bioelectric signal calculation section 7. The bioelectric signal identification section 8 consists of the model PC9821Xa manufactured by NEC.

The fingerprint image input portion 9 captures a fingerprint image of the finger 21 sliding on the finger rest 7 in the arrow direction. The fingerprint input device described in Japanese Patent Laid-open publication No. 190471/1992, for example, may be used as the fingerprint image input section 9. This fingerprint image input portion 9 consists of a light source illuminating the finger 21, a linear image sensor, a lens for focusing the light reflected by the finger 21 on the linear image sensor, a rotary encoder for detecting the slide distance of the finger 21, and a synthetic buffer for synthesizing a one-dimensional image output from the linear image sensor into a two-dimensional image of the finger 21—based on the detection results from the rotary encoder.

The fingerprint collation section 10 collates a fingerprint based on the fingerprint image input by the fingerprint image input section 9. The decision section 11 judges whether or not the collator is a genuine person, based on the identification results from the bioelectric signal identification section 8 and the fingerprint collation results from the fingerprint collation section 10.

The operation of the organism identification system of the embodiment will be described below.

For fingerprint collation, as shown in FIGS. 2 and 3, a fingerprint collator places his finger at the input starting position on the finger rest 22. Then, the finger 21 slides on the finger rest 22 by a predetermined distance in the arrow direction. Meanwhile, the side surface of the finger 21 is always in contact with the finger sliding portion 24. In such a way, since the finger slider slides according to the movement of the finger, the bioelectric potential grounding portion 25 fixed on the finger slider 24 always contacts with the finger at the same position.

When the fingerprint collator slides his finger 21, the fingerprint image input section 9 receives the fingerprint image of the finger 21. The fingerprint collation section 10 collates the fingerprint image with the fingerprint of the fingerprint collator previously stored and then notifies the decision section 11 of the collation results.

Moreover, when the fingerprint collator slides his finger 21, the muscle potential varies. The bioelectric potential lead-out portions 23-1 and 23-2 and the bioelectric grounding portion 25 output electric signals corresponding to the potential variations.

The bioelectric signal amplification section 6 amplifies the difference between signals from the bioelectric potential lead-out portions 3-1 and 3-2 while the bioelectric potential grounding portion 5 is at the ground potential.

While the finger 21 is sliding on the finger rest 22, the bioelectric signal calculation section 7 obtains the frequency, amplitude, polarity and base line variation of an electric signal output from the bioelectric signal amplifier 6 and then transmits the resultant data to the bioelectric signal identification section 8. The sliding operation of the finger 21, for example, can be checked according to the detection result from the rotary encoder (not shown) in the fingerprint image input section 9.

The bioelectric signal identification section 8 identifies whether or not the fingerprint image input object corresponds to a living body based on various pieces of data output from the bioelectric signal calculation section 7 and then transmits the identification result to the decision section 11.

Figure 5:
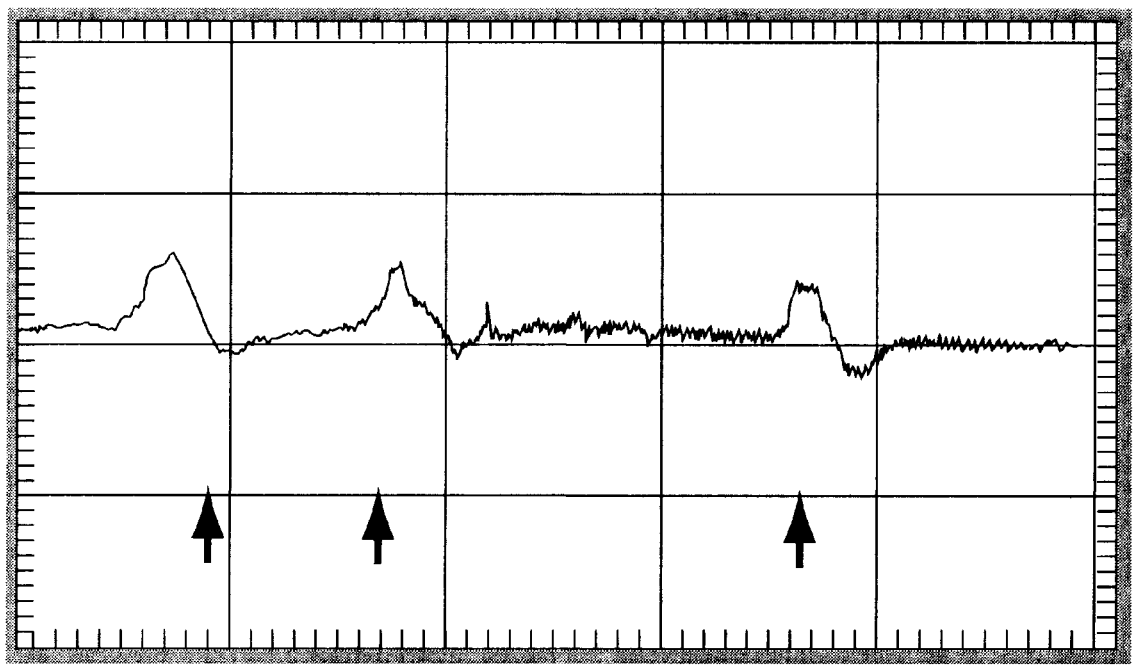
FIG. 5 shows a signal waveform output from the bioelectric signal amplification section 6 when a fingerprint image input object corresponds to a human's finger, in the embodiment shown in FIG. 2.
Figure 6:
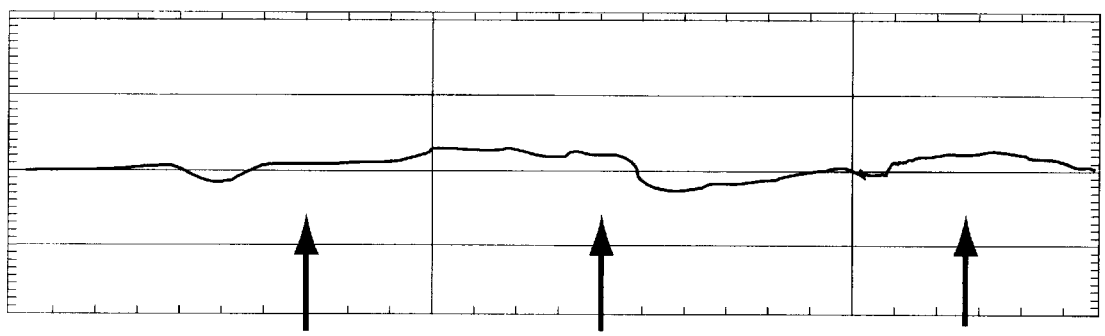
FIG. 6 shows a signal waveform output from the bioelectric signal amplification section 6 when a fingerprint image input object corresponds to a replicated finger, in the embodiment shown in FIG. 2.

FIG. 5 shows a signal waveform output by the bioelectric signal amplifier 6 when the finger 21 slides on the finger rest 22. As shown in FIG. 5, when the finger 21 is still, the base line is maintained nearly to a constant level. A variation of the base line and an increase in amplitude are observed when the finger 21 is in motion. In contrast, if an illegal user places and slides a replica with the same roughness as that of a fingerprint on the finger rest 22, the signal waveform output from the bioelectric signal amplification section 6 does not significantly vary as is shown in FIG. 6. Moreover, when an illegal user slides a replica with electrodes producing an imitation bioelectric signal on the finger rest 22, the electrodes are intermittently contacted with the bioelectric potential lead-out portions 23-1 and 23-2 and the bioelectric grounding portion 25. Consequently, the bioelectric signal amplification section 6 outputs in a non-contact state an electric signal different from that at the time of a sliding human finger 21. When the electrode is changed from a contact state to a non-contact state, and vice versa, high-level noise occurs.

As described above, in the sliding operation of the finger 21 or a replica or a replica with electrodes on the finger rest 21, the bioelectric signal amplifier 6 produces a different waveform. This difference in waveform allows the fingerprint image input object to be discriminated from a living body or a replica. That is, the bioelectric signal identification section 8 can judge whether or not the object corresponds to a living body, based on the various pieces of data output from the bioelectric signal calculation section 7 which indicate the feature of the signal waveform output from the bioelectric signal amplification section 6.

Figure 7:
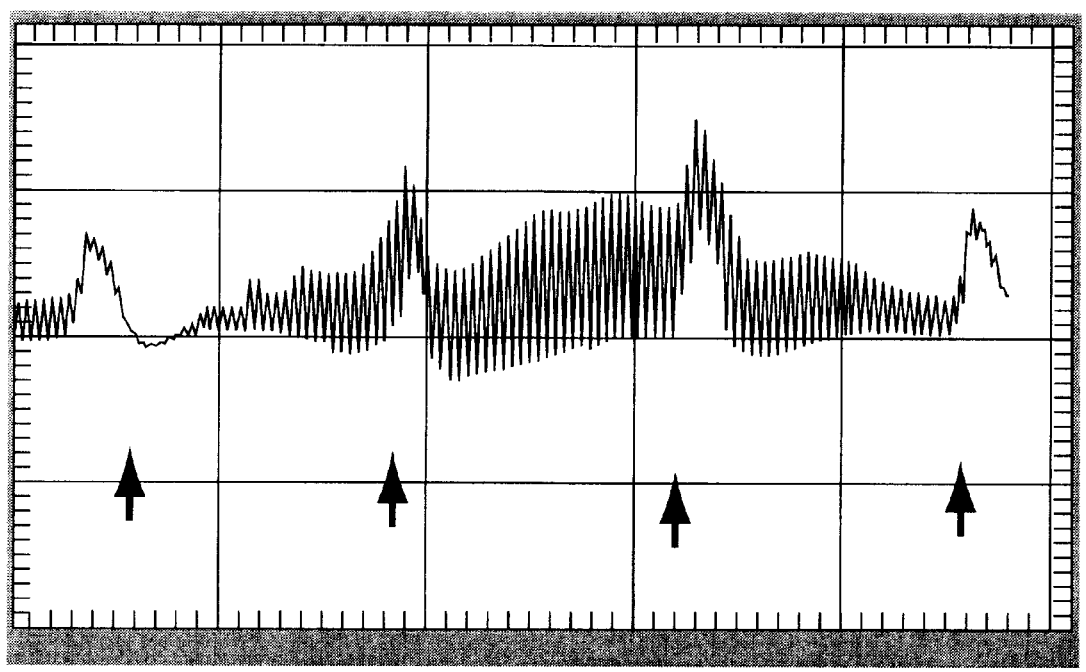
FIG. 7 shows a signal waveform output from the bioelectric signal amplification section 6 during a sliding operation of a finger, with no bioelectric potential ground portion 25.

In the embodiment shown in FIG. 2, the bioelectric potential grounding portion 25 is attached on the finger slider 24. However, whether or not the object sliding on the finger rest 22 is a living body can be identified without using the bioelectric potential grounding portion 25. FIG. 7 shows a signal waveform output from the bioelectric signal amplification section 6 in the case of the absence of the bioelectric potential grounding portion 25. As shown in FIG. 7, the signal waveform contains noise. Like the organism identification system with the bioelectric potential grounding portion 25, a variation of the base line and an increase in amplitude occur. With the bioelectric potential grounding portion 25 removed, when the replica slides, the bioelectric signal amplification section 6 outputs the signal waveform as shown in FIG. 6. In the sliding operation of a replica with electrodes, when the electrodes of the replica are not in contact with the bioelectric potential lead-out portions 23-1 and 23-2 and the bioelectric potential grounding portion 5 is present, the signal waveform output from the bioelectric signal amplification section 6 differs from the signal waveform output by sliding a finger. Hence, even if the bioelectric potential grounding portion 5 is not disposed, the object can be identified as part of a living body. However, the influence of noises can be avoided by disposing the bioelectric potential grounding portion 25 as shown in FIG. 2, so that the object can be correctly identified as a living body.

Figure 8:
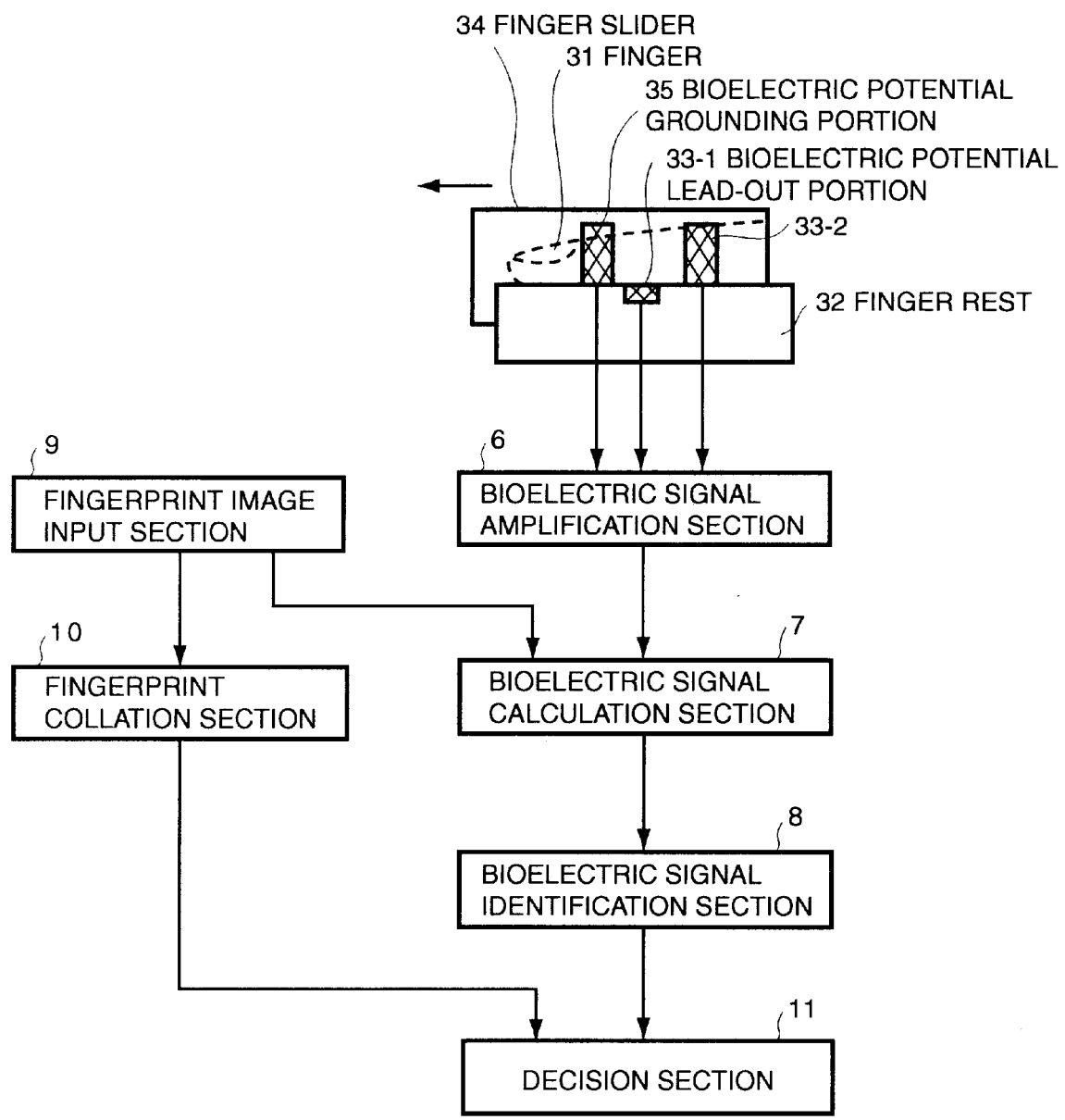
FIG. 8 is a block diagram illustrating an organism identification system according to another embodiment of the present invention.

FIG. 8 is a block diagram showing an organism identification system according to another embodiment of the present invention. The organism identification system comprises a finger rest 32 to be slidden in the arrow direction at the time of inputting a fingerprint image, with the upper surface thereof in contact with the finger 31, two bioelectric potential lead-out portions 33-1 and 33-2, a finger slider 34, and a bioelectric potential grounding portion 35. Like numerals represent the same elements as those shown in FIG. 2.

Figure 9:
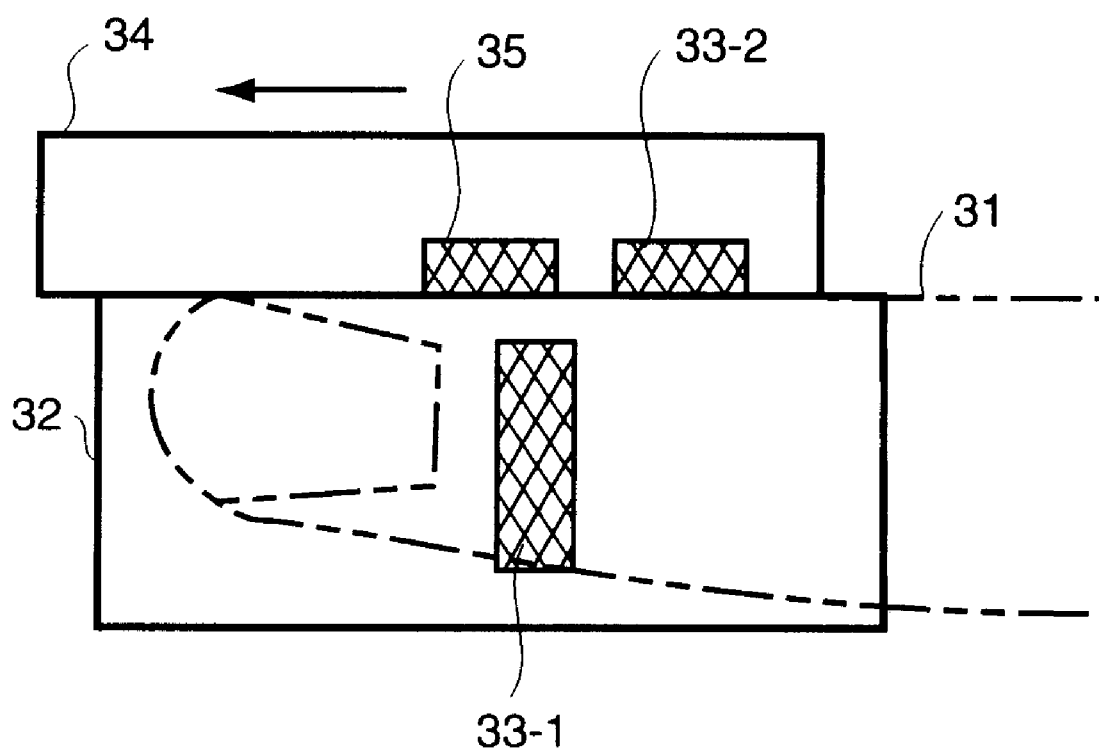
FIG. 9 is a top view illustrating a combination of the finger rest 32 and the finger slider 34 according to an embodiment of the present invention.
Figure 10:
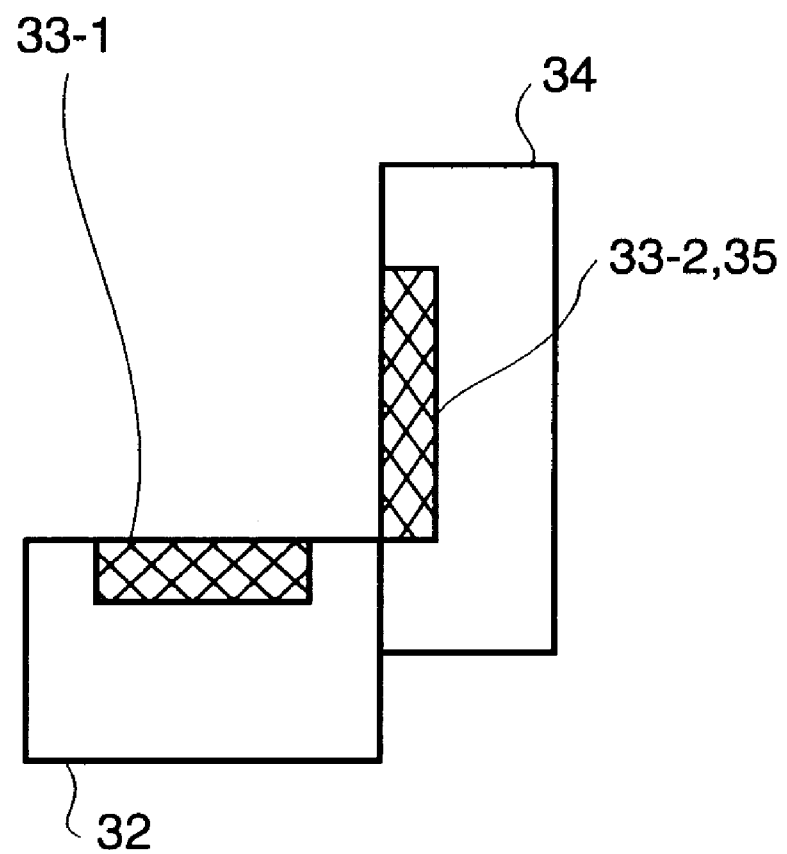
FIG. 10 is a side view illustrating the combination of the finger support 32 and the finger slider 34 according to the embodiment shown in FIG. 8.

FIG. 9 is a top view illustrating a combination of the finger rest 32 and the finger slider 34. FIG. 10 is a side view illustrating a combination of the finger rest 32 and the finger slider 34. Like numerals represent the same elements as those in FIG. 8.

The finger rest 32 comprises a transparent member. The bioelectric lead-out portion 31-1 is fixed on the upper surface of the finger rest 32. The bioelectric potential lead-out portion 33-1 is fixed on the finger rest 32 so as to always contact with part of the finger 31 during input of a fingerprint image when inputting said image, finger 31 is slid on the finger rest 32 in the arrow direction.

The finger slider 34 is slidably mounted on the finger rest 32. With the finger slider 34 contacted with the side surface of the finger 31 shown in FIG. 9, the finger 31 slides according to the movement of the finger slider 34.

The bioelectric potential lead-out portions 33-2 and the bioelectric potential grounding portion 35 are fixed on the side surface of the finger slider 34.

In order to input a fingerprint image, a fingerprint collator places his finger 31 at the input starting position on the finger rest 32 and then slides it by a predetermined distance in the arrow direction, as shown in FIGS. 8 and 9. The finger slider 34 is always in contact with the side surface of the finger 31. In such an operation, since the finger slider 34 slides in the arrow direction according to the movement of the finger 31, the bioelectric potential lead-out portion 33-2 and the bioelectric potential grounding portion 35 are always in contact with the finger 31 at the same position.

When the fingerprint collator slides his finger 31, the fingerprint image input section 9 receives the fingerprint image of the finger 31. The fingerprint collation section 10 implements a fingerprint collation based on the fingerprint image and notifies the decision section 11 of the collation result.

Sliding the finger 31 of the fingerprint collator causes variations in muscle potential. Electric signals corresponding to the potential variations are derived from the bioelectric potential lead-out portions 33-1 and 33-2 and the bioelectric potential grounding portion 35.

The bioelectric signal amplification section 6 amplifies the difference between the signal from the bioelectric potential lead-out portion 33-1 and the signal from the bioelectric potential lead-out portion 33-2 while the bioelectric potential grounding portion 35 is at the ground potential.

Figure 11:
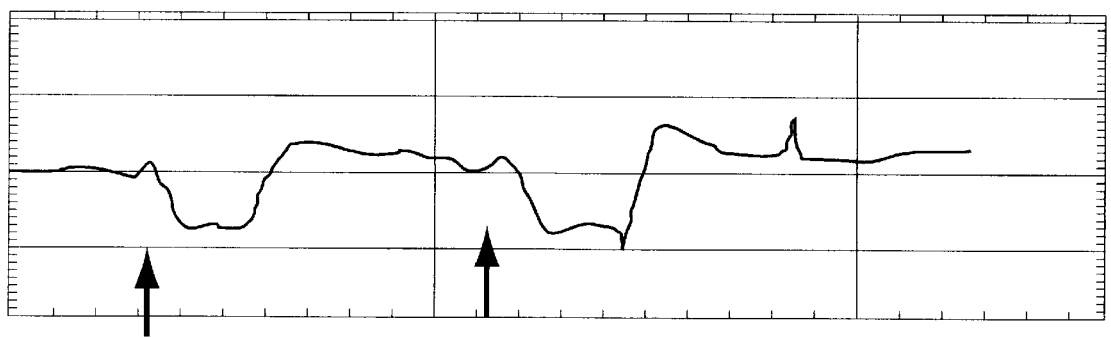
FIG. 11 shows a signal waveform output from the bioelectric signal amplification section 6 when a fingerprint image input object corresponds to a human's finger, in the embodiment of FIG. 8.
Figure 12:
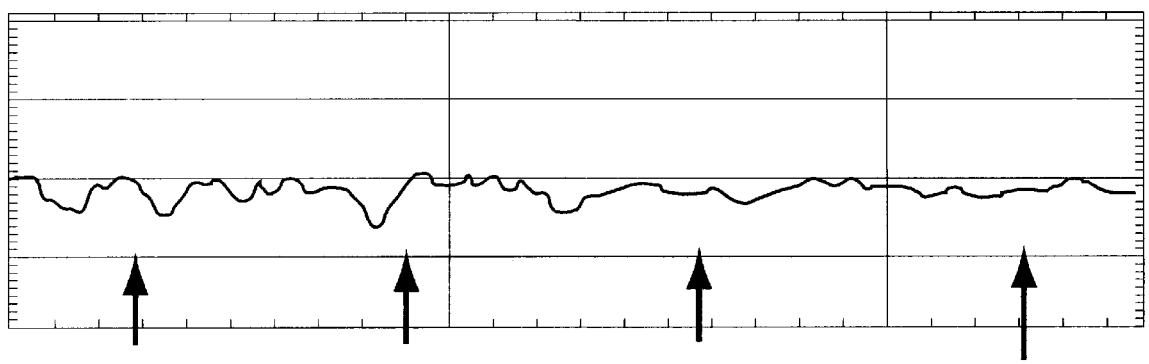
FIG. 12 shows a signal waveform output from the bioelectric signal amplification section 6 when a fingerprint image input object corresponds to a replicated finger, in the embodiment of FIG. 8.

FIG. 11 shows a signal waveform output by the bioelectric signal amplifier 6 when the finger 31 slides on the finger rest 32. As shown in FIG. 11, when the finger 31 is still, the base line is maintained nearly to a constant level. When the finger 31 is in motion, a variation of the base line and an increase in amplitude are observed. In contrast, when an illegal person places and slides a replica with the same roughness as that of a fingerprint on the finger rest 32, the signal waveform output from the bioelectric signal amplifier 6 does not vary as is shown in FIG. 12. Moreover, when an illegal user places and slides a replica with electrodes to produce an imitation bioelectric signal on the finger rest 22, the electrodes are intermittently contacted with the bioelectric potential lead-out portions 33-1 and 33-2 and the bioelectric grounding portion 35. Consequently, in a non-contact state, the electric signal output from the bioelectric signal amplification section 6 differs from that generated at the time of sliding the finger 31. Moreover, changing from a contact state to a non-contact state, and vice versa causes the occurrence of high-level noise.

As described above, when the finger 31 or a replica or a replica with electrodes slides on the finger rest 32, the bioelectric signal amplification section 6 produces a signal with a different waveform. In a similar manner to that of the embodiment shown in FIG. 2, the fingerprint image input object can be identified as a living body or not.

Figure 13:
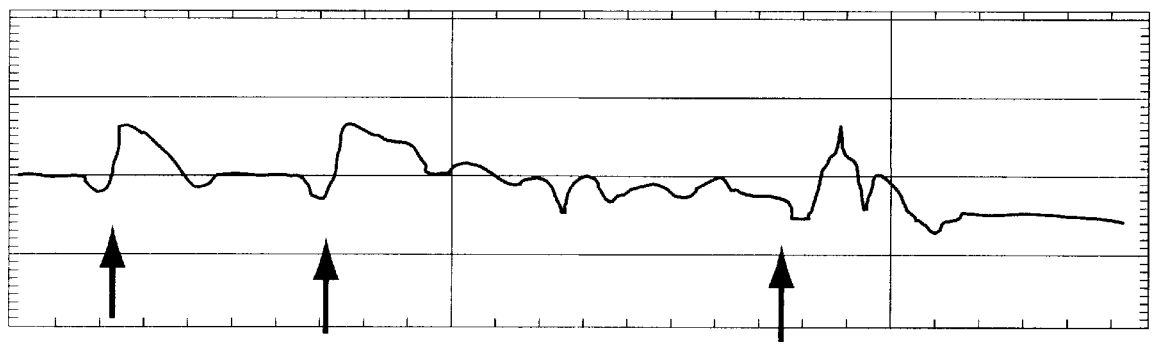
FIG. 13 shows a signal waveform output from the bioelectric signal amplification section 6 during a sliding operation of a finger, with no bioelectric potential ground portion 35.

In the embodiment shown in FIG. 8, the bioelectric potential grounding portion 35 is attached to the finger slider 34. However, an object sliding on the finger rest 32 can be identified as a living body without using the bioelectric potential grounding portion 34. FIG. 13 shows a signal waveform output from the bioelectric signal amplifier 6 in the case of an absence of the bioelectric potential grounding portion 35. As shown in FIG. 13, like the organism identification system with the bioelectric potential grounding portion 35, a variation of the base line and an increase in amplitude occur. In contrast, even if the bioelectric potential grounding portion 35 is not used, the bioelectric signal amplification section 6 still outputs the signal waveform (as shown in FIG. 12) according to the sliding of the replica when a replica is used. When the electrode of the replica is not in contact with the bioelectric potential lead-out portions 33-1 and 33-2, the signal waveform output from the bioelectric signal amplification section 6 differs from the signal waveform produced in the sliding of a finger. Hence, if the bioelectric potential grounding portion 35 is not disposed, the object can still be identified as a living body. However, as shown in FIG. 8, since the influence of noise can be avoided by disposing the bioelectric potential grounding portion 35, it is advantageous to include it.

Figure 14:
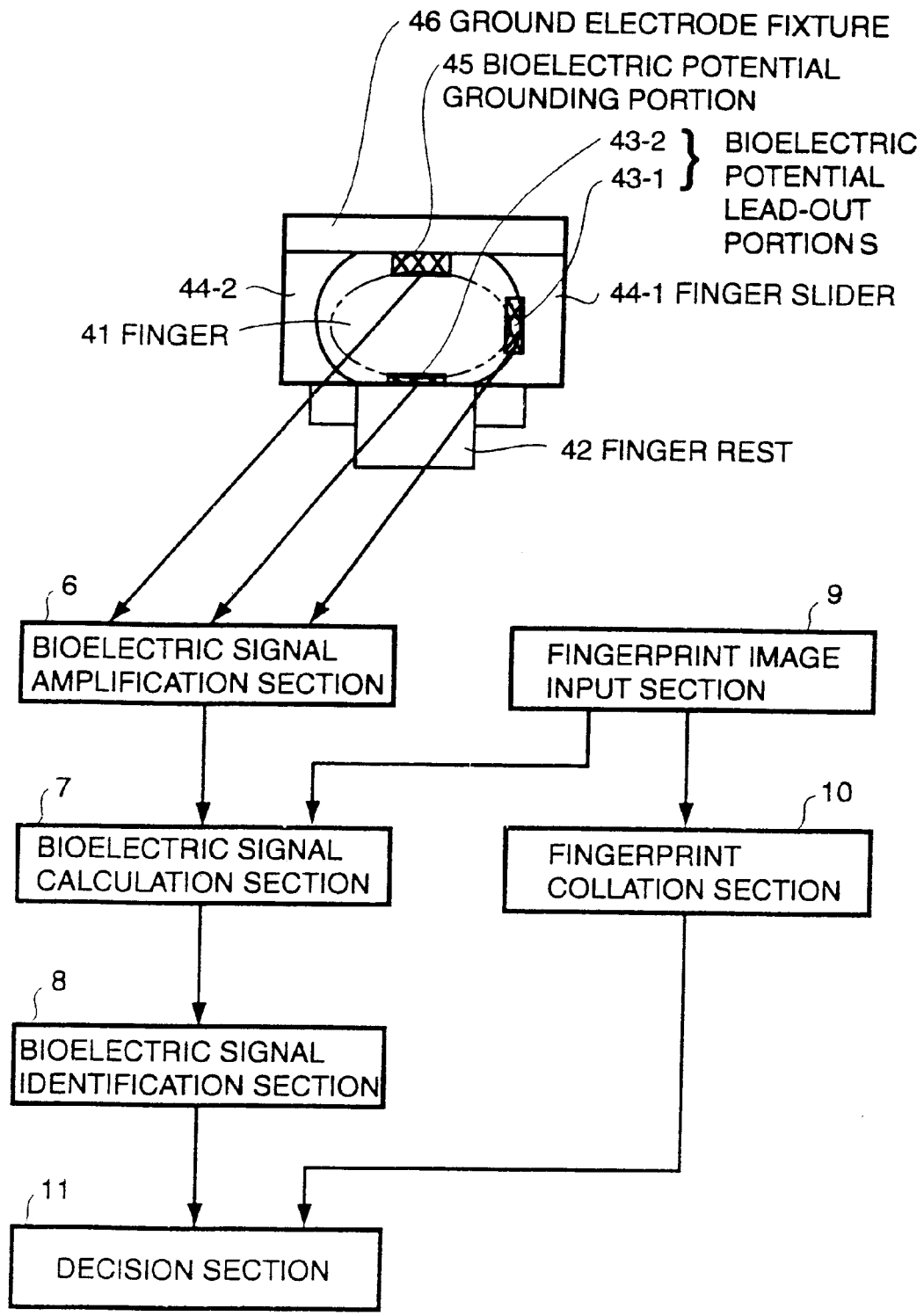
FIG. 14 is a block diagram illustrating an organism identification system according to another embodiment of the present invention.

FIG. 14 is a diagram showing an organism identification system according to another embodiment of the present invention. The organism identification system includes a finger rest 42 slidden in the arrow direction at the time of inputting a fingerprint image, with the upper surface thereof in contact with a finger 41, two bioelectric potential lead-out portions 43-1 and 43-2, two finger sliders 44-1 and 44-2 arranged so as to confront each other, a bioelectric potential grounding portion 45, and a grounding electrode fixture 46. Like numerals represent the same elements as those shown in FIG. 2.

Figure 15:
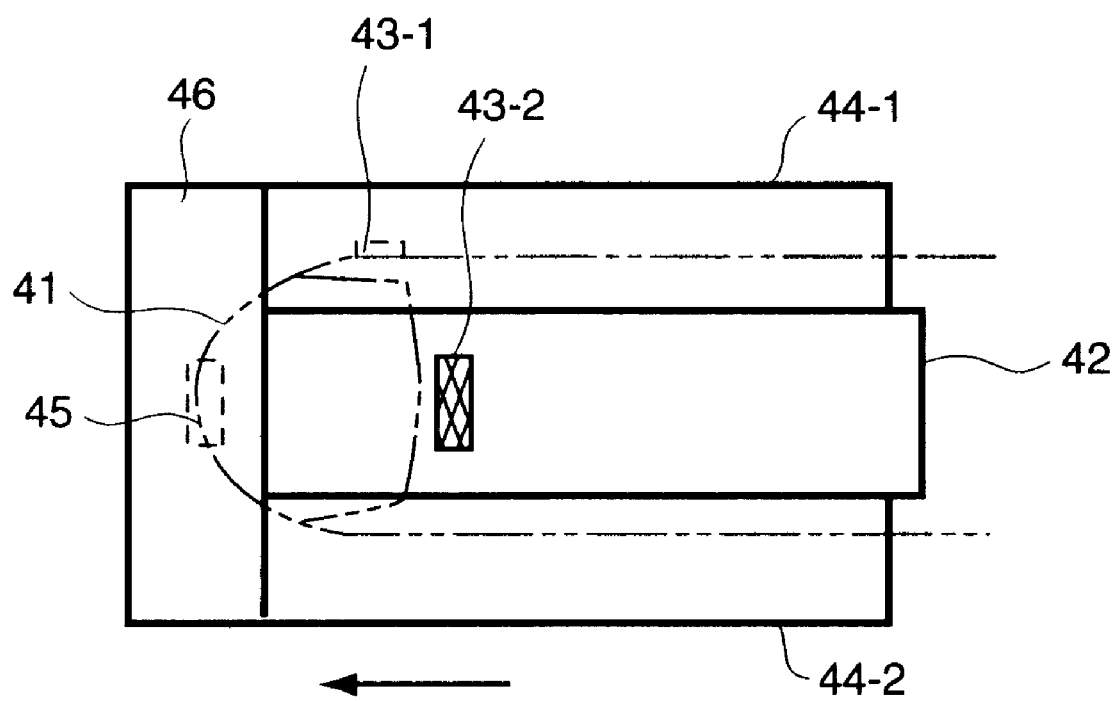
FIG. 15 is a top view illustrating a combination of the finger rest 42 and the finger sliders 44-1 and 44-2 according to an embodiment of the present invention.
Figure 16:
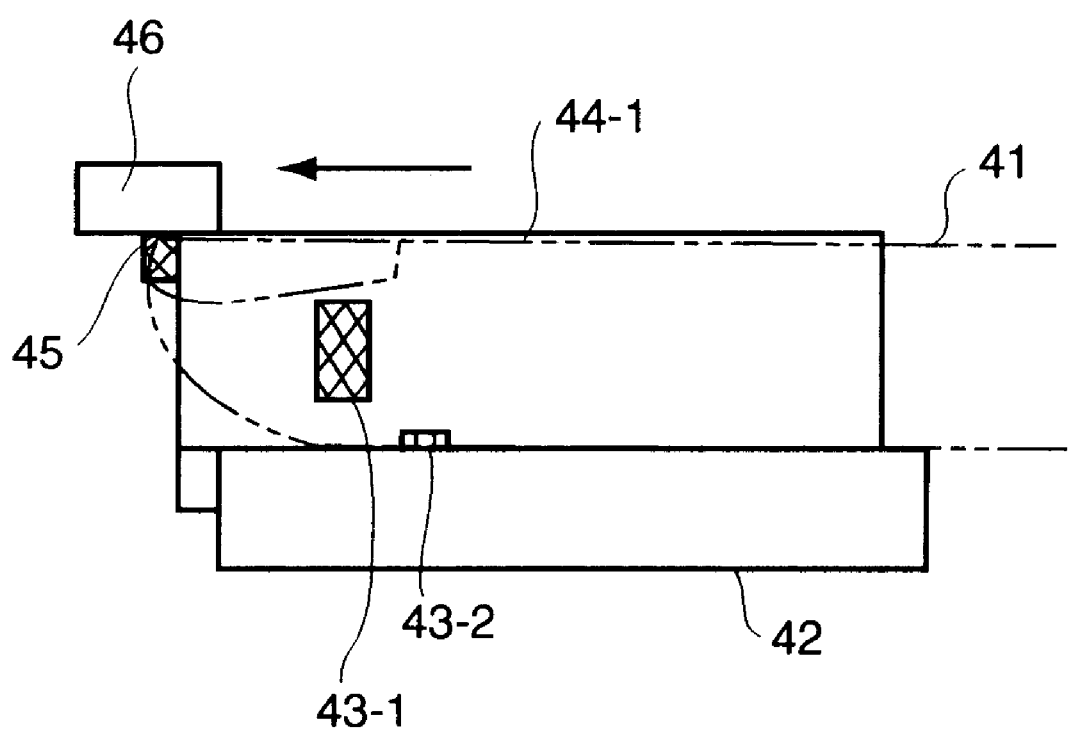
FIG. 16 is a side view illustrating the combination of the finger rest 42 and the finger sliders 44-1 and 44-2 according to the embodiment shown in FIG. 14.

FIG. 15 is a top view illustrating a combination of the finger rest 42 and the finger sliding portions 44-1 and 44-2. FIG. 16 is a side view illustrating a combination of the finger rest 42 and the finger sliders 44-1 and 44-2. Like numerals represent the same elements as those in FIG. 14. In FIG. 16, the finger slider 44-2 is not shown.

The finger rest 42 comprises a transparent member. The bioelectric lead-out portion 43-2 is fixed on the upper surface of the finger rest 42. The bioelectric potential lead-out portion 43-2 is fixed on the finger rest 42 so as to always contact part of the finger 31 during input of a fingerprint image. At that time, finger 41 is slid on the finger rest 42 in the arrow direction.

Two finger sliders 44-1 and 44-2 are slidably mounted on the finger rest 42. The curved surface of the finger slider 44-1 confronts the curved surface of the finger slider 44-2. While being placed on the finger rest 42, the finger 41 contacts with the curved surfaces. The finger sliders 44-1 and 44-2 can be slidden, together with the finger 41, and moved in the arrow direction on the finger rest 42.

The bioelectric potential grounding portion 45 is fixed on the curved surface of the finger slider 44-1 and the lower surface of the grounding electrode fixture 46. The grounding electrode fixture 46 is fixed on the upper end surface of the finger slider 44-1 and on the upper end surface of the finger slider 44-2. The bioelectric potential grounding portion 45 is fixed on the grounding electrode fixture 46 so as to contact with a nail of the finger 41 when the finger 41 is placed on the finger rest 41 as shown in FIG. 16.

As shown in FIGS. 14 to 16, in order to input a fingerprint image, a fingerprint collator places his finger 41 at the input starting position on the finger rest 42 and then slides it by a predetermined distance in the arrow direction. In such a condition, a side surface of the finger 41 is always in contact with the bioelectric potential lead-out portion 43-1 fixed on the finger slider 44-1 while another side surface of the finger 41 is in contact with the bioelectric potential grounding portion 45 fixed on the grounding electrode fixture 46.

When the fingerprint collator slides his finger 41, the fingerprint image input section 9 receives the fingerprint image of the finger 41. The fingerprint collation section 10 implements a fingerprint image based on the fingerprint image and notifies the decision section 11 of the collation result.

Sliding the finger 41 causes the muscle potentials of the finger to be varied. Electric signals corresponding to the potential variation are derived from the bioelectric potential lead-out portions 43-1 and 43-2 and the bioelectric potential grounding portion 45.

The bioelectric signal amplification section 6 amplifies the difference between the signal from the bioelectric potential lead-out portion 43-1 and the signal from the bioelectric potential lead-out portion 43-2.

Figure 17:
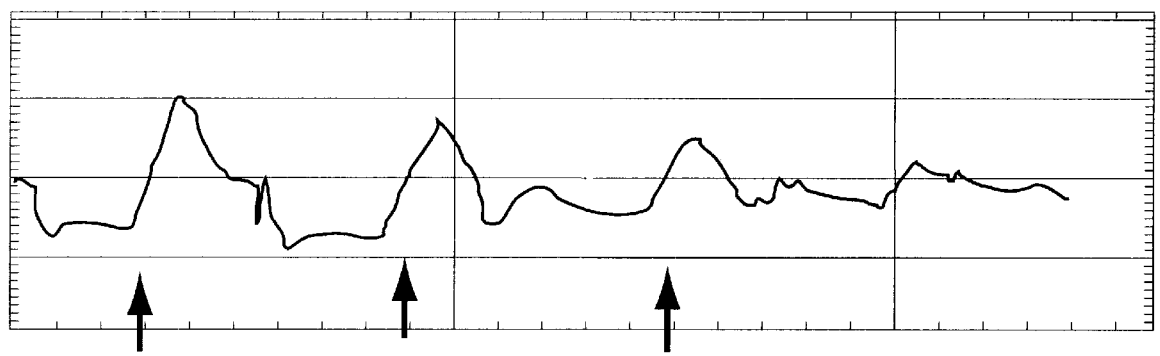
FIG. 17 shows a signal waveform output from the bioelectric signal amplification section 6 when a fingerprint image input object corresponds to a human's finger, in the embodiment of FIG. 14.
Figure 18:
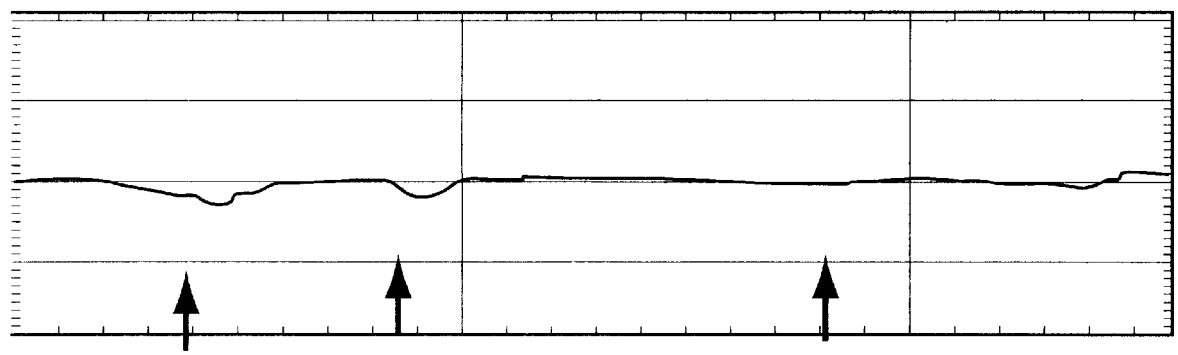
FIG. 18 shows a signal waveform output from the bioelectric signal amplification section 6 when a fingerprint image input object corresponds to a replicated finger, in the embodiment of FIG. 14.

FIG. 17 shows a signal waveform output from the bioelectric signal amplification section 6 when the finger 41 slides on the finger rest 42. As shown in FIG. 17, when the finger 41 is still, the base line is maintained nearly to a constant level. When the finger 41 is in motion, a variation of the base line and an increase in amplitude is observed. In contrast, if an illegal user slides a replica with the same roughness as that of a fingerprint on the finger rest 42, the signal waveform output from the bioelectric signal amplification section 6 does not vary as is shown in FIG. 18. Moreover, when an illegal user slides a replica with electrodes producing an imitation bioelectric signal on the finger rest 42, the electrodes are intermittently contacted with the bioelectric potential lead-out portions 43-1 and 43-2 and the bioelectric grounding portion 45. Consequently, in a non-contact state, the bioelectric signal amplification section 6 outputs an electric signal different from that at the time of sliding the finger 41. Moreover, changing from a contact state to a non-contact state, and vice versa, causes the occurrence of high-level noise.

As described above, when the finger 41 or a replica or a replica with an electrode slides on the finger rest 42, the bioelectric signal amplification section 6 produces a signal with a different waveform. Hence, like the embodiment shown in FIG. 2, it can be identified whether or not the fingerprint image input object corresponds to a living body.

In the embodiment shown in FIG. 14, the bioelectric potential grounding portion 45 is attached on the grounding electrode fixture 46. However, the object sliding on the finger rest 42 can be identified as a living body without using the bioelectric potential grounding portion 45.

However, the influence of noise can be avoided by disposing the bioelectric potential grounding portion 45 as shown in FIG. 14 so that the object can be more accurately identified as a living body.

Figure 19:
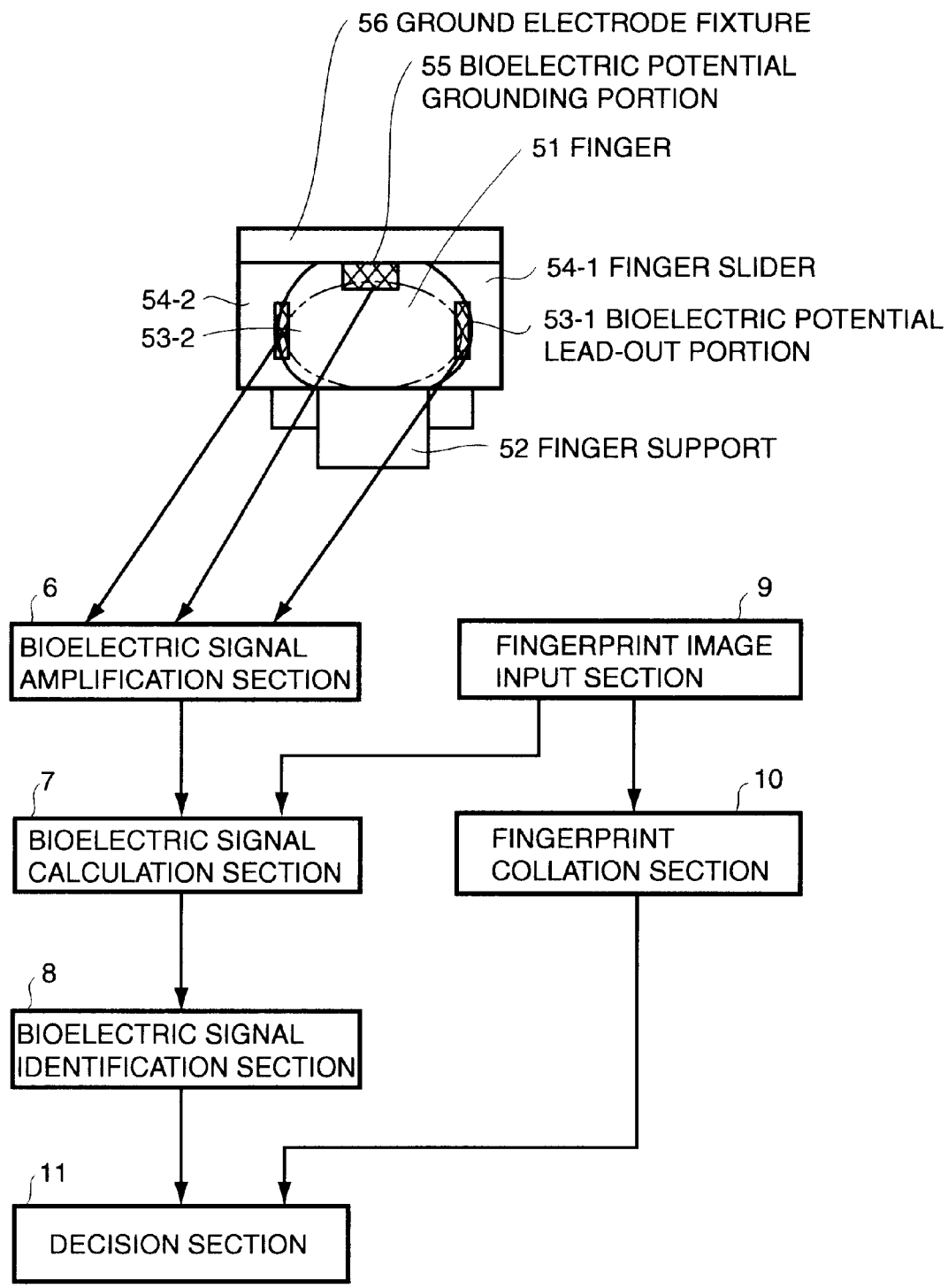
FIG. 19 is a block diagram illustrating an organism identification system according to another embodiment of the present invention.

FIG. 19 is a diagram showing an organism identification system according to further another embodiment of the present invention. The organism identification system includes a finger rest 52 sliding in the arrow direction at the time of inputting a fingerprint image, with the upper surface thereof in contact with a finger 51, two bioelectric potential lead-out portions 53-1 and 53-2, two finger sliders 54-1 and 54-2 arranged so as to confront each other, a bioelectric potential grounding portion 55, and a grounding electrode fixture 56. Like numerals represent the same elements as those shown in FIG. 2.

Figure 20:
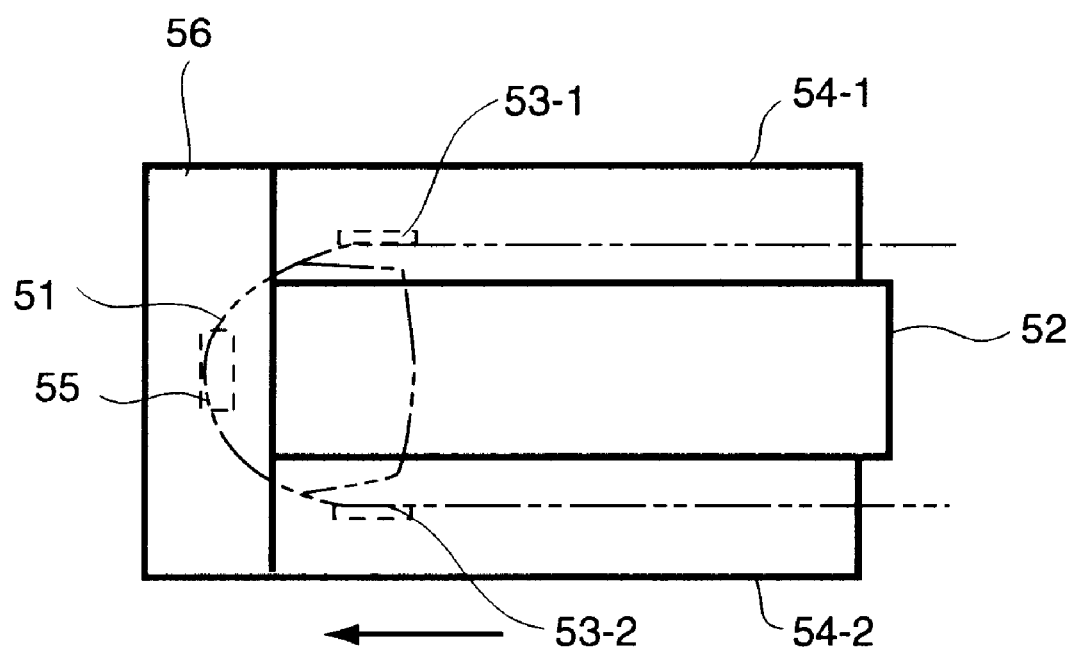
FIG. 20 is a top view illustrating a combination of the finger rest 52 and the finger sliders 54-1 and 54-2 according to another embodiment of the present invention.
Figure 21:
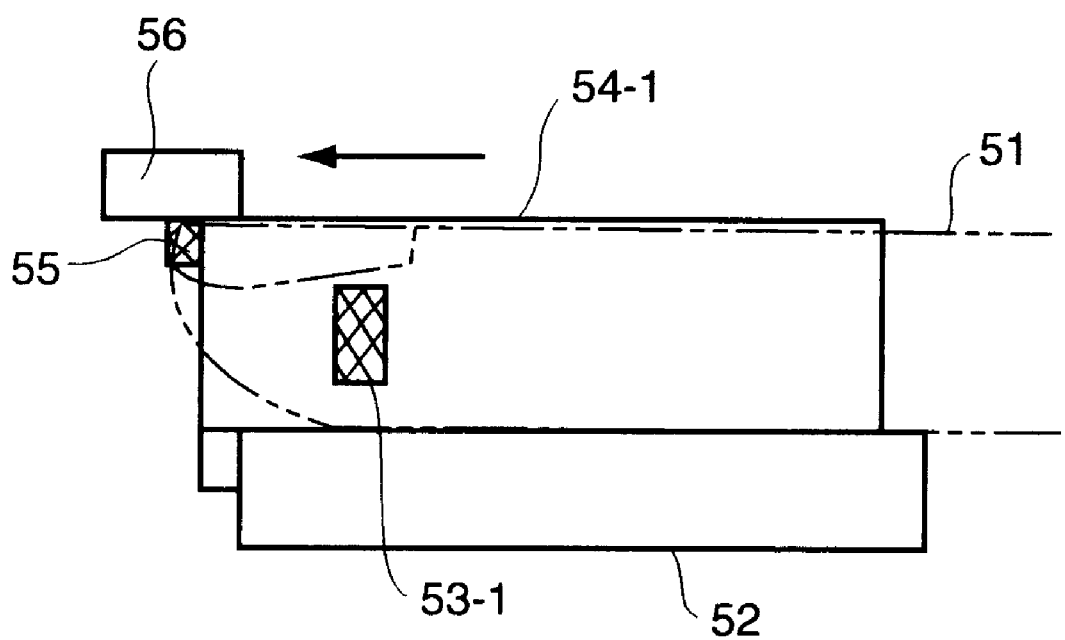
FIG. 21 is a side view illustrating the combination of the finger rest 52 and the finger sliders 54-1 and 54-2 according to the embodiment shown in FIG. 19.

FIG. 20 is a top view illustrating a combination of the finger rest 52 and the finger sliders 54-1 and 54-2. FIG. 21 is a side view illustrating a combination of the finger rest 52 and the finger sliders 54-1 and 54-2. Like numerals represent the same elements as those in FIG. 19. In FIG. 21, the finger slider 54-2 is not shown.

The finger rest 52 comprises a transparent member. Two finger sliders 54-1 and 54-2 are slidably mounted on the finger rest 52. The curved surface of the finger slider 54-1 confronts the curved surface of the finger slider 54-2. When placed on the finger rest 52, the finger 51 is contacted with the curved surfaces. The finger sliders 54-1 and 54-2 can be slidden, together with the finger 51, and moved on the finger rest 52 in the arrow direction.

The bioelectric potential lead-out portion 53-1 is fixed on the curved surface of the finger slider 54-1. The bioelectric potential lead-out portion 53-2 is fixed on the curved surface of the finger slider 54-2. The grounding electrode fixture 56 is fixed on the upper end surface of the finger slider 54-1 and on the upper end surface of the finger slider 54-2. The bioelectric potential grounding portion 55 is fixed on the lower surface of the grounding electrode fixture 56. The bioelectric potential grounding portion 55 is fixed on the grounding electrode fixture 56 so as to contact with a nail of the finger 51 when the finger 51 is placed on the finger rest 52 as shown in FIG. 21.

In order to input a fingerprint image, a fingerprint collator places his finger 51 at the input starting position on the finger rest 52 and then slides it by a predetermined distance in the arrow direction, as shown in FIGS. 19 to 21. In such a condition, a side surface of the finger 51 is always contacted with the bioelectric potential lead-out portion 53-1 fixed on the finger sliding portion 54-1 while another side surface of the finger 51 is contacted with the bioelectric potential lead-out portion 56 fixed on the finger sliding portion 54-2. The nail is contacted with the bioelectric potential grounding portion 55 fixed on the grounding electrode fixture 56.

When the fingerprint collator slides his finger 51, the fingerprint image input section 9 receives the fingerprint image of the finger 51. The fingerprint collation section 10 implements a fingerprint collation based on the fingerprint image and notifies the decision section 11 of the collation result.

When a finger collator slides the finger 51, the muscle potential of the finger 51 varies, so that an electric signal corresponding to the potential variation is derived from the bioelectric potential lead-out portions 53-1 and 53-2 and the bioelectric potential grounding portion 55.

The bioelectric signal amplification section 6 amplifies the difference between the signal from the bioelectric potential lead-out portion 53-1 and the signal from the bioelectric potential lead-out portion 53-2 while the bioelectric grounding portion 55 is set to the ground potential.

Figure 22:
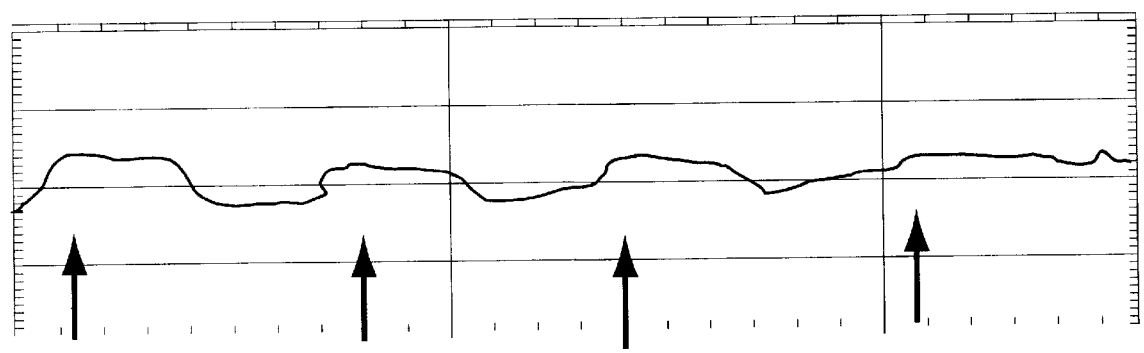
FIG. 22 shows a signal waveform output from the bioelectric signal amplification section 6 when a fingerprint image input object corresponds to a human's finger, in the embodiment of FIG. 19.
Figure 23:
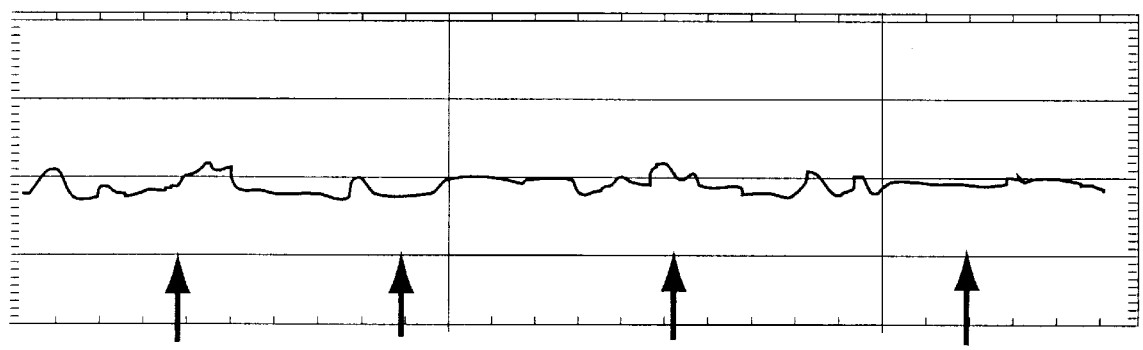
FIG. 23 shows a signal waveform output from the bioelectric signal amplification section 6 when a fingerprint image input object corresponds to a replicated finger, in the embodiment of FIG. 19.

FIG. 22 shows a signal waveform output by the bioelectric signal amplification section 6 when the finger 51 slides on the finger rest 52. As shown in FIG. 22, when the finger 51 is still, the base line is maintained nearly to a constant level. When the finger 51 is in motion, a variation of the base line and an increase in amplitude are observed. In contrast, if an illegal user slides a replica with the same rough surface as that of a fingerprint on the finger rest 42, the signal waveform output from the bioelectric signal amplification section 6 does not vary as is shown in FIG. 23.

As described above, when the finger 51 and a replica, respectively, slide on the finger rest 52, the bioelectric signal amplification section 6 produces a different waveform. Hence, the fingerprint image input object can be identified as a living body like the embodiment shown in FIG. 2.

In the embodiment shown in FIG. 19, the bioelectric potential grounding portion 55 is attached on the grounding electrode fixture 56. However, the object sliding on the finger rest 52 can be identified as a living body without using the bioelectric potential grounding portion 55.

Figure 24:
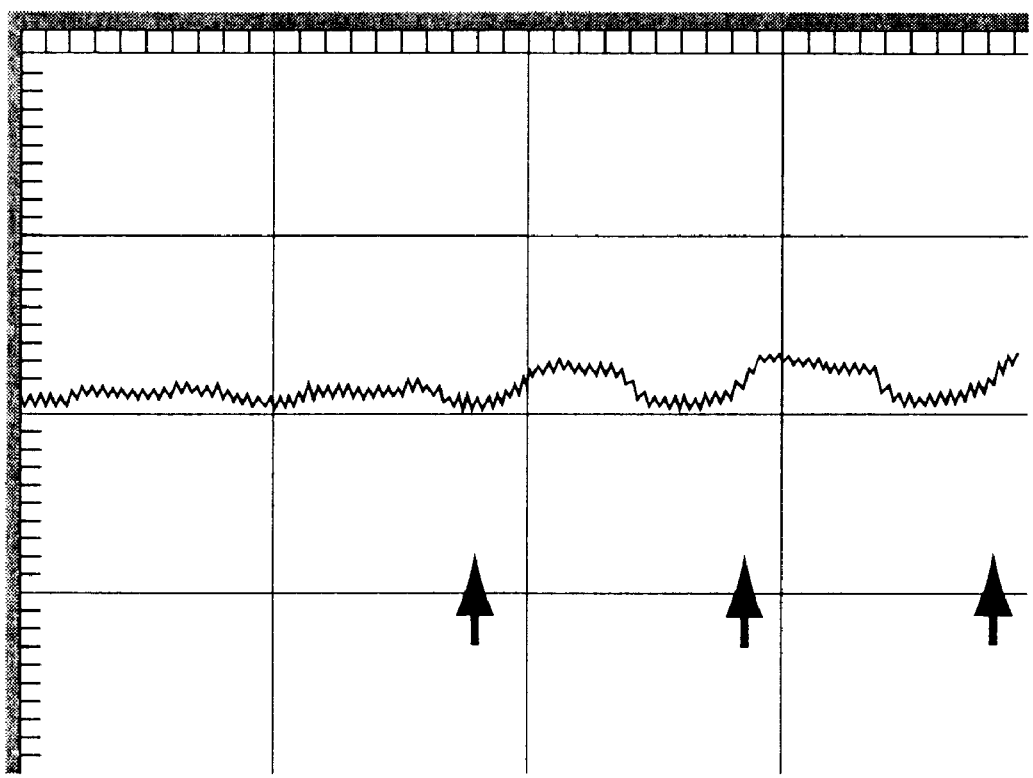
FIG. 24 shows a signal waveform output from the bioelectric signal amplification section 6 while a finger is sliding, with no bioelectric potential ground portion 55.

FIG. 24 shows a signal waveform from the bioelectric signal amplification section 6 in the case of the absence of the bioelectric potential grounding portion 55. As shown in FIG. 24, the signal waveform contains noise. Like the case where the bioelectric potential grounding portion 55 is disposed, the base line varies and the amplitude increases. In contrast, when a replica is used, the bioelectric signal amplification section 6 produces the signal waveform shown in FIG. 23. Consequently, even if there is no bioelectric potential grounding portion 55, the object can be identified as a living body. However, as shown in FIG. 19, since the bioelectric potential grounding portion 55 is immune to the influence of noise it is advantageous to include it.

As described above, according to the present invention, the organism identification system includes a bioelectric potential lead-out portion for leading an electric signal generated by a fingerprint image input object which slides on a finger rest to input a fingerprint image, and an identification section for identifying whether or not the object is a living body, based on the electric signal. Thus, it can be identified whether or not the object is a living body.

According to the present invention, the organism identification system includes a bioelectric potential grounding portion fixed to a finger slider which slides according to the movement of a fingerprint image input object sliding on the finger rest, and a bioelectric signal amplification section for outputting the difference between electric signals derived from plural bioelectric potential lead-out portions to the bioelectric signal identification section while the bioelectric potential grounding portion is at the grounding potential. This arrangement can prevent the signal with which the bioelectric signal identification section identifies whether or not an object is the living body, from being mixed with noise.

Moreover, according to the present invention, the organism identification system includes a grounding electrode fixture fixed on the finger slider so as to confront the finger rest, the distance between the upper surface of the finger rest and the grounding electrode fixture nearly corresponds to the height of a finger, and a bioelectric potential grounding portion fixed on the grounding electrode fixture. This arrangement can reduce the risk that a finger is separated from the bioelectric potential grounding portion or is shifted from the contact portion, during the sliding of the finger on the finger rest. As a result, it is possible to minimize the risk that noise is mixed with the signal used for organism identification in the bioelectric signal identification section.

The entire disclosure of Japanese Patent Application No. 9-062247 filed on Feb. 28, 1997 including specification, claims, drawing and summary are incorporated herein by reference in its entirety.

What is claimed is:

1. An organism identification system, comprising:
    a finger rest having a support surface on which an object slides when a fingerprint image is to be taken;
    at least one sensor, for measuring an electric signal produced by said object as said object slides on said finger rest; and
    an identification system which identifies whether or not said object corresponds to a living body based on said electric signals measured from said at least one sensor.

2. The organism identification system of claim 1, wherein said at least one sensor is fixed on said finger rest.

3. The organism identification system of claim 1 wherein said at least one sensor comprises a plurality of bioelectric potential lead-out portions.

4. An organism identification system, comprising:
    a finger rest having a support surface on which an object slides when a fingerprint image is to be taken;
    at least one sensor for measuring an electric signal produced from the object as said object slides on said finger rest;
    a finger slider which slides according to movement of said object, said finger slider being in contact with said object as said object slides on said finger rest;
    an amplifier producing a difference electric signal between electric signals from said at least one sensor; and
    an identification system which identifies whether or not said object corresponds to a living body based on the difference electric signal derived from said amplifier.

5. The organism identification system of claim 4, wherein all of said sensors are fixed on said finger rest.

6. The organism identification system of claim 4, wherein some of said sensors are fixed on said finger rest and wherein any other of said sensors are fixed on said finger slider.

7. The organism identification system of claim 4 wherein said at least one sensor comprises a plurality of bioelectric potential lead-out portions.

8. An organism identification method comprising the steps of:
    sliding an object on a surface of a finger rest at the time of inputting a fingerprint image;
    measuring electric signals produced by said object sliding on said finger rest; and
    identifying whether or not said object corresponds to a living body based on said measured electric signals.

9. An organism identification system comprising:
    a finger rest having a support surface on which an object slides when a fingerprint image is to be taken;
    at least one sensor for measuring an electric signal produced from the object as said object slides on said finger rest;
    a finger slider which slides according to movement of said object, said finger slider being in contact with said object as said object slides on said finger rest;
    an amplifier producing a difference electric signal between electric signals from said at least one sensor;
    an identification system which identifies whether or not said object corresponds to a living body based on the difference electric signal derived from said amplifier; and
    a ground electrode fixture fixed on said finger slider so as to confront said finger rest, a distance between an upper surface of said finger rest and said ground electrode fixture nearly corresponding to a height of a finger; and
    a grounding portion fixed on said ground electrode fixture;
    wherein some of said sensors are fixed on said finger rest; and
    wherein any other of said sensors are fixed on said finger slider.

10. The organism identification system of claim 9, wherein all of said sensors are fixed on said finger rest.

11. A system for detecting whether an object is a living finger, said system comprising:
    a finger rest;
    at least one detector which measures electric signals generated by said object as said object is moved across said finger rest; and
    a processor which determines, based upon said signals, whether said object is a living finger.

12. The system as claimed in claim 11, wherein said at least one detector comprises a plurality of bioelectric lead-out portions.

13. The system as claimed in claim 11, further comprising a grounding portion disposed on said finger rest.

14. The system as claimed in claim 11, further comprising a finger slider which maintains contact with said object as said object is moved across said finger rest.

15. The system as claimed in claim 11, further comprising a fingerprint detector which receives a fingerprint image, wherein said processor determines whether said object is a living finger when said fingerprint image is being received by said fingerprint detector.

16. The system as claimed in claim 15, wherein said processor comprises:
    an amplifier which amplifiers said electric signals thereby producing amplified signals;
    a calculator which produces characteristics of said amplified signals while said fingerprint image is received; and an identifier which identifies whether said object is a living finger based on said characteristics.

17. A method of determining whether an object is a living finger, said method comprising:

measuring electric signals generated by said object as said object is moved across a finger rest; and determining, based upon said signals, whether said object is a living finger.

18. The method as claimed in claim 17, wherein said electric signals are measured using a plurality of bioelectric potential lead-out portions.

19. The method as claimed in claim 17, further comprising providing a grounding portion on said finger rest.

20. The method as claimed in claim 17, further comprising:

providing a finger slider in contact with said object; and maintaining contact between said finger slider and said object during said step of moving.

21. The method as claimed in claim 17, further comprising:

receiving a fingerprint image, wherein said step of determining follows said step of receiving.

22. The method as claimed in claim 21, wherein said step of determining comprises the following:

amplifying said electric signals thereby producing amplified signals;

calculating characteristics of said amplified signals after said step of receiving; and identifying whether said object is a living finger based upon said characteristics.

* * * * *